United States Patent
Derocher et al.

(10) Patent No.: US 10,577,010 B2
(45) Date of Patent: Mar. 3, 2020

(54) TELESCOPING STEERING COLUMN

(71) Applicant: STEERING SOLUTIONS IP HOLDING CORPORATION, Saginaw, MI (US)

(72) Inventors: Robert C. Derocher, Essexville, MI (US); Todd M. King, Saginaw, MI (US); James E. Rouleau, Burt, MI (US); Donald A. Buzzard, Saginaw, MI (US); Melvin L. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 101 days.

(21) Appl. No.: 15/864,382

(22) Filed: Jan. 8, 2018

(65) Prior Publication Data
US 2019/0210633 A1    Jul. 11, 2019

(51) Int. Cl.
*B62D 1/181*  (2006.01)
*B62D 1/189*  (2006.01)
*F16H 25/20*  (2006.01)
*B62D 1/183*  (2006.01)

(52) U.S. Cl.
CPC ............ *B62D 1/181* (2013.01); *B62D 1/183* (2013.01); *B62D 1/189* (2013.01); *F16H 25/20* (2013.01); *F16H 2025/2084* (2013.01)

(58) Field of Classification Search
CPC ........ B62D 1/181; B62D 1/183; B62D 1/185; B62D 1/187; B62D 1/189; F16H 25/20; F16H 2025/2084; F16H 2025/2059
See application file for complete search history.

(56) References Cited

U.S. PATENT DOCUMENTS

| | | | | |
|---|---|---|---|---|
| 4,691,587 A | * | 9/1987 | Farrand | B62D 1/181 280/775 |
| 4,716,780 A | * | 1/1988 | Nishikawa | B62D 1/181 280/775 |
| 4,785,684 A | * | 11/1988 | Nishikawa | B62D 1/181 280/775 |

(Continued)

FOREIGN PATENT DOCUMENTS

| | | |
|---|---|---|
| DE | 102015216326 B4 | 9/2016 |
| JP | 2001199350 A  * 7/2001 | ............. B62D 1/181 |

(Continued)

OTHER PUBLICATIONS

English translation regarding DE102015216326B4, ThyssenKrupp AG; 21 pgs.

*Primary Examiner* — Laura Freedman

(57) ABSTRACT

A telescoping steering column is constructed to be mounted to a vehicle structure. The telescoping steering column includes a plurality of jackets in telescopic relation to one another along a telescopic axis, an electric motor, at least one leadscrew, first and second thread sets, and first and second nuts. The plurality of jackets include a first jacket and a second jacket. The electric motor is rigidly fixed to one of the plurality of jackets. Then at least one leadscrew is rotationally driven by the electric motor. The first and second thread sets are carried by the at least one leadscrew. The first and second nuts are threaded upon the respective first and second thread sets, and attached to the respective first and second jackets.

20 Claims, 4 Drawing Sheets

(56) References Cited

U.S. PATENT DOCUMENTS

| | | | | |
|---|---|---|---|---|
| 4,901,593 A * | 2/1990 | Ishikawa | ............... | B62D 1/181 280/775 |
| 5,036,720 A * | 8/1991 | Shirasawa | ............... | B62D 1/181 74/441 |
| 5,690,362 A * | 11/1997 | Peitsmeier | ............. | B62D 1/181 280/775 |
| 5,911,789 A * | 6/1999 | Keipert | ............... | B62D 1/181 280/775 |
| 6,079,743 A * | 6/2000 | Grams | ............... | B62D 1/181 280/775 |
| 6,142,523 A * | 11/2000 | Bathis | ............... | B62D 1/181 280/777 |
| 6,390,505 B1 * | 5/2002 | Wilson | ............... | B62D 1/181 280/775 |
| 7,410,190 B2 * | 8/2008 | Sawada | ............... | B62D 1/19 180/427 |
| 8,011,265 B2 * | 9/2011 | Menjak | ............... | B62D 1/181 74/425 |
| 8,161,839 B2 * | 4/2012 | Warashina | ............ | B62D 1/181 74/493 |
| 9,487,228 B2 * | 11/2016 | Fevre | .................. | B62D 1/181 |
| 9,744,983 B2 * | 8/2017 | Stinebring | ............ | B62D 1/181 |
| 10,189,496 B2 * | 1/2019 | King | ................... | B62D 1/184 |
| 2006/0283281 A1 * | 12/2006 | Li | ......................... | B62D 1/181 74/495 |
| 2017/0015345 A1 * | 1/2017 | Galehr | ................ | B62D 1/181 |
| 2017/0361863 A1 * | 12/2017 | Rouleau | .............. | B62D 1/185 |
| 2018/0134308 A1 * | 5/2018 | Derocher | ............. | B62D 1/183 |
| 2018/0251147 A1 * | 9/2018 | Heitz | ................... | B62D 1/181 |

FOREIGN PATENT DOCUMENTS

| | | | |
|---|---|---|---|
| JP | 2018192929 A | * | 12/2018 |
| JP | 2018197006 A | * | 12/2018 |

* cited by examiner

TELESCOPING STEERING COLUMN

BACKGROUND

The present disclosure relates to steering columns, and more particularly, to a telescoping steering column.

Steering columns are known to adjust in length axially. The adjustment places a steering wheel closer to, or further away from, a user for user comfort and convenience. More recent steering column applications include that for autonomous vehicles. For such applications, telescoping steering columns may include a stowed position, wherein the steering wheel is generally out of reach from an otherwise user of the steering wheel. Unfortunately, placement of a steering column, or steering wheel, into a stowed position is complex and relatively expensive to manufacture. Moreover, the time it takes for a steering column to retract into a stowed position is relatively long.

Accordingly, improvements in the means of retracting a steering column into, for example, a stowed position is desirable.

SUMMARY

In one, non-limiting, exemplary embodiment of the present disclosure, a telescoping steering column is constructed to be mountable to a vehicle structure. The telescoping steering column includes a plurality of jackets in telescopic relation to one another along a telescopic axis, an electric motor, at least one leadscrew, first and second thread sets, and first and second nuts. The plurality of jackets include a first jacket and a second jacket. The electric motor is rigidly fixed to one of the plurality of jackets. Then at least one leadscrew is rotationally driven by the electric motor. The first and second thread sets are carried by the at least one leadscrew. The first and second nuts are threaded upon the respective first and second thread sets, and attached to the respective first and second jackets.

In another embodiment, a telescoping steering column is constructed to be mountable to a vehicle structure. The telescoping steering column includes an upper jacket, a second jacket, a rake bracket, an electric motor, at least one leadscrew, a first thread set, a second thread set, a first nut, and a second nut. The second jacket is in telescopic relation to the upper jacket. The rake bracket is in telescopic relation to the second bracket and is pivotally engaged to the vehicle structure. The electric motor is rigidly fixed to one of the second jacket and the rake bracket. The at least one leadscrew is rotationally driven by the electric motor. The first thread set is carried by the at least one leadscrew. The second thread set is carried by the at least one leadscrew. The first nut is threaded upon the first thread set, and is attached to the upper jacket. The second nut is threaded upon the second thread set, and is attached to one of the second jacket and the rake bracket. The electric motor is rigidly fixed to the other of the second jacket and the rake bracket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
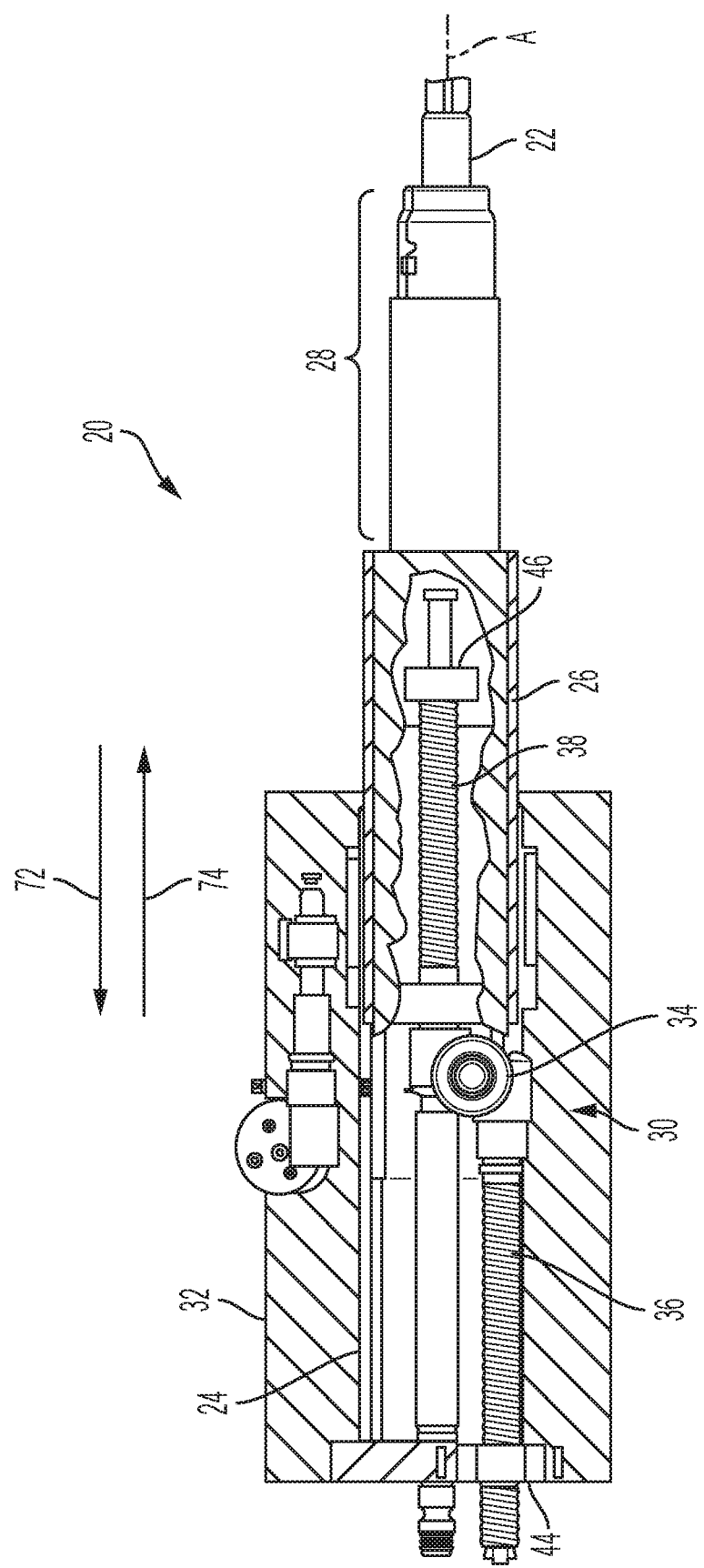
FIG. 1 is a bottom view of a telescoping steering column with portions removed to show internal detail.

Referring now to the Figures, where the invention will be described with reference to specific embodiments, without limiting same, a telescoping steering column 20 is illustrated. Referring to FIG. 1, the steering column 20 is illustrated in an extended state and is adapted for telescopic motion along a telescopic axis A, and between a retracted state and the extended state generally for user comfort. That is, the telescoping steering column 20 is capable of being telescopically adjusted (i.e., between the retracted state and the extended state) to suit the size and/or steering wheel reach of the user. In another embodiment, the telescoping steering column 20 may be a stowable steering column adapted to telescopically move to a stowed state from the retracted state. When in stowed state, a steering wheel (not shown) of the steering column 20 may be out of reach from the user, and may be the preferred state when a vehicle is operating, for example, in an autonomous mode. It is contemplated and understood that the term "steering column" may include I-shafts.

The telescoping steering column 20 may include a steering shaft 22, three jackets 24, 26, 28, and a telescoping drive device 30 adapted to axially reposition the steering column 20 between the stowed, retracted, and extended states. The jackets 24, 26, 28 are constructed to move telescopically with respect to one-another along axis A. In one embodiment, the jacket 24 may be generally located radially outward (i.e., with respect to axis A) from jacket 26, jacket 26 may be located radially outward from jacket 28, and jacket 28 may be located radially outward from the steering shaft 22. The steering shaft 22 may be rotationally supported by the jacket 28. The jacket 28 may be in sliding relation to, and supported by, the jacket 26. The jacket 26 may be in sliding relation to, and supported by the jacket 24. In one example, the jacket 28 may be an upper jacket, and the jacket 24 may be a rake bracket that is pivotally engaged to a support structure 32 of the vehicle.

Figure 2:
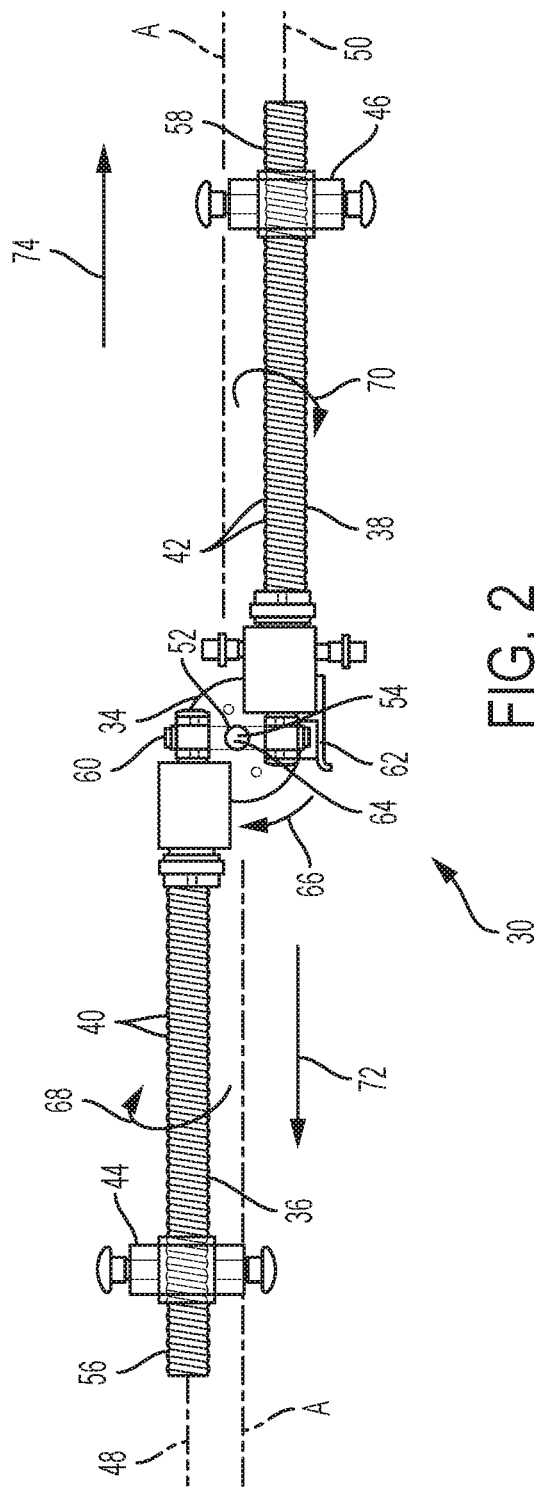
FIG. 2 is a top view of a telescoping drive device of the telescoping steering column.

Referring to FIGS. 1 and 2, the telescoping drive device 30 may include an electric motor 34, at least one leadscrew (i.e., two illustrated as 36, 38), two thread sets 40, 42 (see FIG. 2), and two nuts 44, 46 (i.e., threaded shuttles). Thread set 40 may be formed into (i.e., carried by) the leadscrew 36, and thread set 42 may be formed into the leadscrew 38. The nut 44 may be engaged to the jacket 24 (i.e., rake bracket) and threaded upon the thread set 40 of the leadscrew 36. The nut 46 may be engaged to the jacket 28 (i.e., upper jacket), and threaded upon the thread set 42 of the leadscrew 38. The electric motor 34 may be rigidly mounted to (i.e., fixed to) the jacket 26.

In one embodiment, the thread sets 40, 42 may be of the same type. That is, both thread sets 40, 42 may be a left hand type, or alternatively, a right hand type. The respective nuts 44, 46 may coordinate with the thread set type. Therefore, if the thread set type is a left hand type, then the nuts 44, 46 are left hand nuts, and vice-versa.

The leadscrews 36, 38 project in opposite axial directions with respect to axis A. Each leadscrew 36, 38 may include a respective rotation axis 48, 50. Although radially offset from one another, the axis A, 48, 50 may be substantially parallel to one-another. The electric motor 34 may include a rotating shaft 52 having a rotation axis 54 disposed substantially normal to the leadscrews 36, 38, and centered therebetween.

Each lead screw 36, 38 includes, and axially extends between, respective distal end portions 56, 58 and respective, opposite, geared end portions 60, 62. A gear 64 of the electric motor 34 is operably meshed with geared end portion 60 of the leadscrew 36 at a first circumferential location with respect to rotation axis 54 of the motor shaft 52, and meshed with geared end portion 62 of the leadscrew 38 at a second circumferential location that is diametrically opposite the first circumferential location. The geared interface between the motor shaft 52 and the geared end portions 60, 62 of the respective leadscrews 36, 38 may entail any variety of gears including bevel gears, helical gears, worm gears, and others. In one embodiment, the motor shaft gear 64 may be a worm gear.

In another embodiment, the leadscrews 36, 38 may axially extend along a common axis and may be attached at the respective end portions 60, 62 (i.e. a continuous rod). In this embodiment, both leadscrews 36, 38 may be driven by a common, single, gear meshed with the shaft gear 64, and generally carried by one or both portions 60, 62. Further, the thread set 40 may be of a left hand type and the thread set 42 may be of a right hand type, or vice-versa.

With continued reference to FIGS. 1 and 2, during operation of the telescoping drive device 30, and in one example, as the electric motor 34 rotates the motor shaft 52 in a clockwise direction (see arrow 66 about axis 54, the shaft gear 64 drives the leadscrews 36, 38 in counter rotating directions (see arrows 68, 70) via the respective gear end portions 60, 62. In one example, the leadscrew 36 may rotate in a clockwise direction 68 when viewed from the motor 34 and in an axial forward direction (see arrow 72), and the leadscrew 38 may rotate in a clockwise direction 70 when viewed from the motor 34 and in an opposite, axial, rearward direction (see arrow 74).

As the leadscrews 36, 38 counter-rotate the nuts 44, 46 generally function as shuttles and ride upon the respective leadscrews 36, 38 with the respective thread sets 40, 42 urging the nuts 44, 46 axially toward the motor 34. Because the nut 44 is engaged to the rake bracket 24 (i.e., jacket) that pivotally attaches to the vehicle structure 32 and the motor 34 is fixed to the mid jacket 26, the axial travel of nut 44 upon the rotating leadscrew 36 causes the jacket 26 to move axially with respect to the vehicle structure 32, and telescope into the rake bracket 24. Moreover, this axial displacement generally along the leadscrew 36 also contributes toward axial displacement of the upper jacket 28 and steering shaft 22 in the same axial direction (see arrow 72 in FIG. 2) since the nut 46, that is attached to the upper jacket 28, and the associated lead screw 38 is attached to the motor 34 which is carried by the mid jacket 26. Axial motion along direction 72 equates to the steering column 20 moving from the extended state and toward the retracted state and/or stowed state.

Because the nut 46 is engaged to the upper jacket 28 that rotationally supports the steering shaft 22 and the motor 34 is fixed to the mid jacket 26, the axial travel of nut 46 upon the rotating leadscrew 38 causes the upper jacket 28 to move axially within the mid jacket 26. The axial motion described in the direction 72 equates to the steering column 20 moving from the extended state and toward the retracted state and/or stowed state. Reversal of the motor shaft 52 rotation will reverse the rotation of the leadscrews 36, 38 causing the steering column 20 to move from the stowed and/or retracted states and toward the extended state. It is contemplated and understood that the thread sets 40, 42 may have the same pitch, thus producing the same rate of axial displacement, or different thread pitches producing different rates of axial displacement along the respective leadscrews 36, 38.

Figure 3:
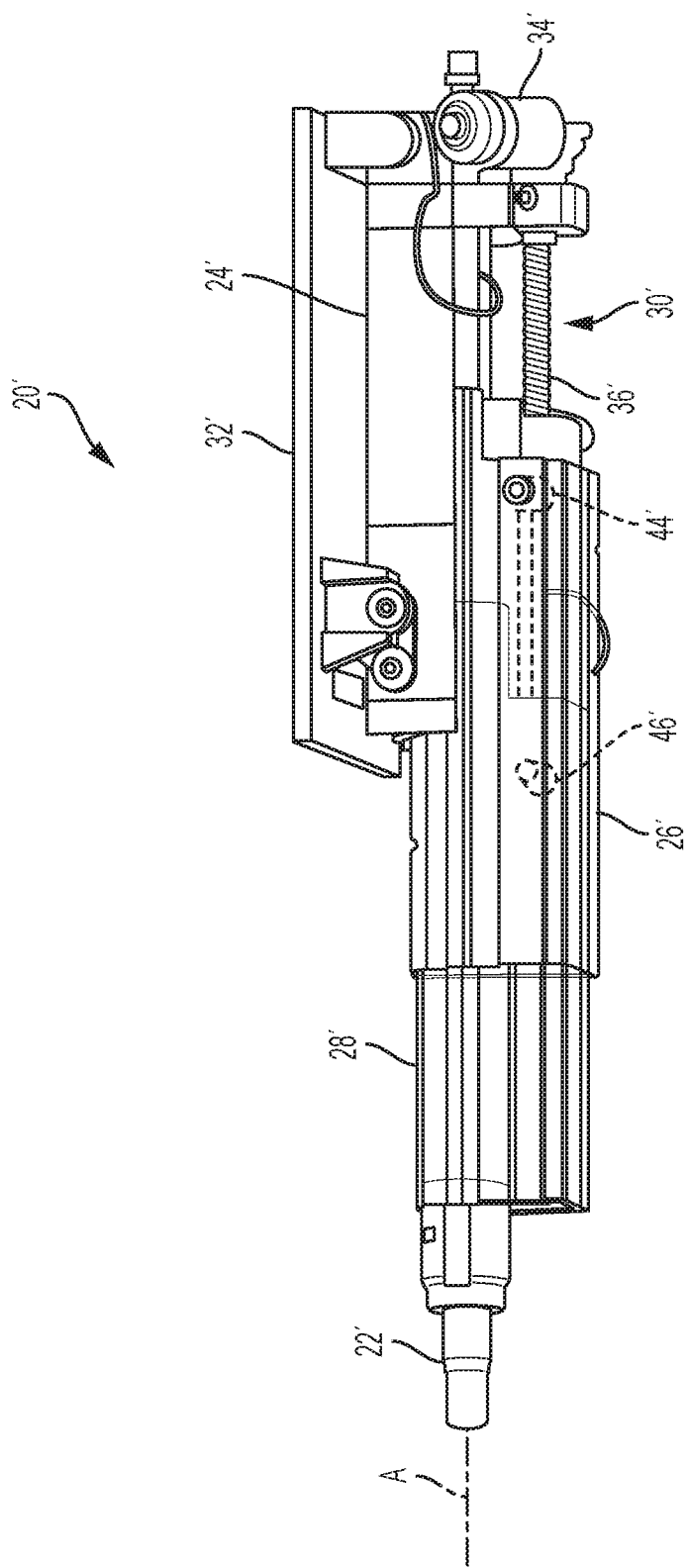
FIG. 3 is a perspective side view of a second embodiment of the telescoping steering column.
Figure 4:
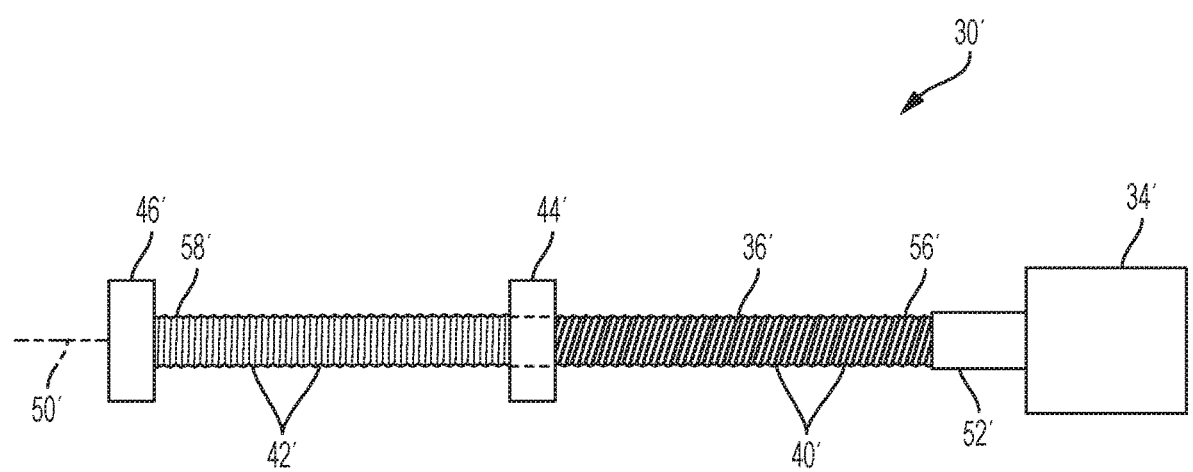
FIG. 4 is a top view of a second embodiment of the telescoping drive device.

Referring to FIGS. 3 and 4, another embodiment of a steering column is illustrated wherein like elements to the first embodiment have like identifying numerals except with the addition of a prime symbol suffix. A telescoping steering column 20' may include a steering shaft 22', three jackets 24', 26', 28', and a telescoping drive device 30' adapted to axially reposition the steering column 20' between the stowed, retracted, and extended states. The jacket 28' may be an upper jacket, and the jacket 24' may be a rake bracket that is pivotally engaged to a support structure 32' of a vehicle.

Referring to FIGS. 3 and 4, the telescoping drive device 30' may include an electric motor 34', a single leadscrew 36' extending along a rotation axis 50', two thread sets 40', 42' (see FIG. 4), and two nuts 44', 46'. Both thread sets 40', 42' are formed into the leadscrew 36'. The nut 44' may be engaged to the jacket 26' (i.e., mid jacket) and threaded upon the thread set 40'. The nut 46' may be engaged to the jacket 28' (i.e., upper jacket), and threaded upon the thread set 42'. The electric motor 34' may be rigidly mounted to (i.e., fixed to) the jacket 24' (e.g., rake bracket), and a shaft 52' of the motor 34' may extend co-axially with the leadscrew 36'. More specifically, the leadscrew 36' includes, and extends between, a distal end portion 58' and an opposite end portion 56'. The motor 34' is end mounted to the leadscrew 36', thus the end portion 56' may be engaged to the motor shaft 52'.

In one embodiment, the thread sets 40', 42' may be of the same type, but the thread pitches of the thread sets 40', 42' may be different. For example, the thread pitch of the thread set 42' may be about twice the thread pitch of the thread set 40'. In this example, the axial displacement rate of the nut 46' may be about twice as fast as the axial displacement rate of the nut 44' when the leadscrew is rotating. By varying thread pitches, packaging options with regard to the steering column 20' may be increased.

Advantages and benefits of the present disclosure include quicker stow times when stowing a steering column in, for example, autonomous vehicle applications utilizing a single actuator or motor. Other advantages may include a simple and robust design with reduced weight and cost, a simplification of control systems, improved audible noise performance, and minimal maintenance.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A telescoping steering column mounted to a vehicle structure, the telescoping steering column comprising:

a plurality of jackets in telescopic relation to one another along a telescopic axis, the plurality of jackets comprising a first jacket and a second jacket;

an electric motor rigidly fixed to one of the plurality of jackets;

at least one leadscrew rotationally driven by the electric motor;

a first thread set carried by the at least one leadscrew;

a second thread set carried by the at least one leadscrew;

a first nut threaded upon the first thread set and attached to the first jacket; and a second nut threaded upon the second thread set and attached to the second jacket.

2. The telescoping steering column set forth in claim 1, wherein the at least one leadscrew extends axially.

3. The telescoping steering column set forth in claim 1, wherein the at least one leadscrew includes a first leadscrew and a second leadscrew, the first thread set is carried by the first leadscrew and is one of a left hand type and a right hand type, the second thread set is carried by the second leadscrew and is the same as that carried by the first leadscrew.

4. The telescoping steering column set forth in claim 3, wherein the first and second leadscrews project from the electric motor in opposite axial directions.

5. The telescoping steering column set forth in claim 3, wherein a thread pitch of the first thread set is different than a thread pitch of the second thread set.

6. The telescoping steering column set forth in claim 3, further comprising:

a third jacket in telescopic relation to the first and second jackets along the telescopic axis, wherein the electric motor is fixed to the third jacket.

7. The telescoping steering column set forth in claim 6, wherein the first jacket is a rake bracket constructed to be pivotally engaged to the vehicle structure.

8. The telescoping steering column set forth in claim 6, wherein the second jacket is an upper jacket adapted to telescope into the third jacket.

9. The telescoping steering column set forth in claim 1, wherein the at least one leadscrew is a single lead screw, and the second thread set is disposed axially between the electric motor and the first thread set.

10. The telescoping steering column set forth in claim 9, wherein the first and second thread sets are of the same type.

11. The telescoping steering column set forth in claim 9, further comprising:

a third jacket in telescopic relation to the first and second jackets.

12. The telescoping steering column set forth in claim 11, wherein the electric motor is fixed to the third jacket.

13. The telescoping steering column set forth in claim 12, wherein the third jacket is a rake bracket pivotally engaged to the vehicle structure.

14. The telescoping steering column set forth in claim 13, wherein the second jacket is telescopically engaged to the rake bracket, and the first jacket is an upper jacket telescopically engaged to the second jacket for telescopic movement into the second jacket.

15. The telescoping steering column set forth in claim 14, wherein the first and second thread sets are of the same type.

16. The telescoping steering column set forth in claim 15, wherein a pitch of the first thread set is different than a pitch of the second thread set.

17. The telescoping steering column set forth in claim 16, wherein a first axial distance measured between the first nut and the second nut is about half of a second distance measured between the second nut and the electric motor when the telescoping steering column is in an extended state, and an axial displacement rate of the second nut is about double an axial displacement rate of the first nut when the electric motor drives the single leadscrew.

18. A telescoping steering column for mounting to a vehicle structure, the telescoping steering column comprising:

an upper jacket;

a second jacket in telescopic relation to the upper jacket;

a rake bracket in telescopic relation to the second jacket and constructed to be pivotally engaged to the vehicle structure;

an electric motor rigidly fixed to one of the second jacket and the rake bracket;

at least one leadscrew rotationally driven by the electric motor;

a first thread set carried by the at least one leadscrew;

a second thread set carried by the at least one leadscrew;

a first nut threaded upon the first thread set and attached to the upper jacket; and a second nut threaded upon the second thread set and attached to one of the second jacket and the rake bracket, wherein the electric motor is rigidly fixed to the other of the second jacket and the rake bracket.

19. The telescoping steering column set forth in claim 18, wherein the at least one leadscrew is a single leadscrew, the first and second thread sets are of the same type, and the electric motor is rigidly fixed to the rake bracket.

20. The telescoping steering column set forth in claim 18, wherein the at least one lead screw includes a first leadscrew and a second leadscrew projecting in opposite telescopic directions, the first thread set is carried by the first lead screw, the second thread set is carried by the second leadscrew, the first and second thread sets are of the same type, and the electric motor is rigidly fixed to the second jacket.

* * * * *